United States Patent
Prévost et al.

[19]

[11] Patent Number: 6,048,282
[45] Date of Patent: Apr. 11, 2000

[54] LINE SYSTEM FOR PLAYING FIELD

[76] Inventors: Jean Prévost; Jacques J Prévost, both of 447 Mount Stephen, Montreal, Quebec, Canada, H3Y 2X8

[21] Appl. No.: 09/139,774

[22] Filed: Aug. 25, 1998

[30] Foreign Application Priority Data

May 26, 1998 [CA] Canada ................................ 2238953

[51] Int. Cl.[7] .......................... A63B 69/36; D03D 27/00; A01N 3/00; B32B 3/02
[52] U.S. Cl. .................... 473/490; 273/DIG. 13; 428/17
[58] Field of Search ................... 473/415, 171, 473/278, 490; 273/DIG. 8, DIG. 12, DIG. 13; 428/17

[56] References Cited

U.S. PATENT DOCUMENTS

| | | | |
|---|---|---|---|
| 3,157,557 | 11/1964 | Palmer | 473/171 |
| 3,513,062 | 5/1970 | Vinicki | 473/171 |
| 3,727,347 | 4/1973 | Barnes | 47/32 |
| 3,995,079 | 11/1976 | Haas, Jr. | 473/278 |
| 4,044,179 | 8/1977 | Haas, Jr. | 473/490 |
| 4,103,886 | 8/1978 | Eley | 473/490 |
| 4,755,401 | 7/1988 | Friedrich et al. | 273/DIG. 13 |
| 4,946,719 | 8/1990 | Dempsey | 273/DIG. 13 |
| 5,586,408 | 12/1996 | Bergevin | 47/1.01 |
| 5,830,080 | 11/1998 | Reynolds | 473/278 |
| 5,958,527 | 9/1998 | Prevost | 428/17 |

FOREIGN PATENT DOCUMENTS

| | | |
|---|---|---|
| 2 618 345 | 1/1989 | France . |
| WO 98/20205 | 5/1998 | WIPO . |

*Primary Examiner*—Steven Wong
*Assistant Examiner*—Mitra Aryanpour
*Attorney, Agent, or Firm*—Parkhurst & Wendel, L.L.P

[57] ABSTRACT

A method of visually marking a line in a natural grass turf playing surface by embedding a synthetic grass strip within the natural turf of football fields and the like. The synthetic strip has a middle band of light colored synthetic grass to mark the line and outer bands of green colored synthetic grass which blend in with the adjacent natural grass. Installation commences with cutting a shallow trench in the turf surface. The synthetic grass turf marking strip is laid into the trench and resilient granular ballast is deposited on the strip backing between upstanding grass-like tufted ribbons. The natural grass adjacent the outer green synthetic ribbons gradually grows into and blends with the outer edges of the outer synthetic green ribbon bands. The outer green colored bands inhibit the lateral spread of natural grass over the light colored middle band. The light colored middle band of synthetic ribbons remains clear of natural grass to mark visually playing field lines in a permanent manner requiring significantly less maintenance than conventional line marking systems.

15 Claims, 4 Drawing Sheets

LINE SYSTEM FOR PLAYING FIELD

TECHNICAL FIELD

The invention is directed to an artificial turf strip for use in visually marking a line in a natural grass turf surface by embedding a synthetic grass marking strip in a shallow trench, and for installation between patio stones to simulate natural grass.

BACKGROUND OF THE ART

Sport playing fields have conventionally been covered with natural grass or more recently with synthetic grass surfaces to replace natural grass, since natural grass does not stand up well to constant wear and requires a great deal of maintenance.

For games played on natural grass, there is a need to mark out the perimeters of the play area and various boundaries of the game to be played. For example, football and soccer playing surfaces have conventionally been marked with rope, paint, ribbons or powdered chalk. The natural grass of course grows constantly and is subjected to rain and wind. Replacing the lines of paint and chalk on natural grass fields is necessary especially in professional sport and involves high labour and material costs. The placement of powdered chalk and paint is also dependent upon weather and wind conditions which tends to increase the labour costs involved.

Paint and chalk often kill the surrounding grass and their use represents an undesirable source of soil and air pollution resulting from repetitive application of paint to the same area.

The alternative of providing a complete synthetic grass sport surface is usually only practical where professional sports are involved due to the high cost of the synthetic grass surface and accompanying maintenance. Natural grass surfaces do not grow well in partially and fully enclosed sports stadiums. Synthetic grass surfaces stand up much better to wear than natural grass surfaces, especially where traffic is heavy.

Providing a permanent line marking on synthetic grass surfaces is relatively simple. The synthetic grass surface is constructed of a fabric backing with tufted synthetic ribbons in a manner similar to the fabrication of a carpet. In order to mark permanent lines in a synthetic grass surface, white coloured ribbons are tufted in selected line patterns or the lines are painted or dyed after fabrication of the synthetic grass surface. In either case, there is a relatively straightforward means to produce permanent line markings in synthetic grass surfaces compared to natural grass surfaces.

The cost of installing large areas of synthetic grass surfaces prohibits the use of this solution for most commonly used outdoor play areas. Parks and schools or university athletic fields often carry more volume of play traffic than a professional sports arena would encounter, and suffer from excessive wear. In addition, the funds required to replace natural grass surfaces are often simply not available.

Natural grass surfaces with repeated paint or chalked lines often cake up and cause ridges that an athlete can trip on and may result in injury or inconsistent play.

The use of chalk lines or paint on natural grass surfaces is essentially a temporary installation since during play, the lines are scuffed by abrasion. The definition of such temporary lines is poor unless repeated maintenance is undertaken to improve the definition for various sports.

An object of a first embodiment of the present invention is to provide a permanent marking system for natural grass turf surfaces in order to reduce the cost and labor involved in maintenance of the lines.

A further object of the first embodiment is to provide superior definition of playing lines on a natural grass turf surface to address the blurring and smearing of chalk or paint lines.

A further object of the first embodiment is to remove the physical obstacles to play and avoid tripping hazards that are present in conventional use of chalk or paint ridges.

A further object of the first embodiment is to avoid the damaging of grass surfaces with paint and to avoid environmental pollution caused by repeated application of paint with solvents and chalk which tends to effect the acidity of the soil adjacent.

An object of the second embodiment is to eliminate the need to trim natural grass strips disposed between adjacent patio stones. A common method of patio installation is to lay patio stones into a natural grass turf with the resulting surface having strips of natural grass disposed between adjacent patio stones. A disadvantage of this design is that the natural grass turf grows laterally over the adjacent patio stones and can substantially cover the stones if not trimmed on a regular basis. Trimming grass about the patio stone edges is time consuming and may expose soil surfaces that encourage weed growth. Controlling lateral overgrowth adds significant labour to the maintenance of such patio surfaces. The grass overgrowth and accompanying weed growth detracts from the aesthetic appeal of combined grass and stone patio surfaces.

DISCLOSURE OF THE INVENTION

The invention in a first embodiment provides a novel method of visually marking a line in a natural grass turf playing surface by embedding a synthetic grass strip within the turf of football, or soccer fields for example.

The synthetic strip has a middle band of light coloured synthetic grass to mark the line and outer bands of green coloured synthetic grass which blends in with the adjacent natural grass. Conventional line marking methods involve chalk or paint which damages the grass, needs frequent replacement and cause built up ridges which impose a risk during play.

Installation commences with cutting a shallow trench in the turf surface with a sod cutter for example. The synthetic grass turf marking strip is laid into the trench. The strip includes an elongate flexible sheet backing, the underside of which is placed on the trench bottom. Tufted through the backing are parallel rows of synthetic ribbons, extending upwardly from the top surface of the backing a pile height sufficient to extend a selected distance above the trench. The rows of ribbons include a middle band of ribbons of a light colour to mark the line and a pair of outer bands of ribbons of a green colour laterally adjacent the middle band.

The strip is then buried in the trench under granular ballast material deposited on the backing and between the parallel rows of synthetic ribbons with an upper portion of the ribbons extending beyond the ballast, in a manner similar to artificial turf.

The turf marking strip may be further embedded and secured within the natural turf with a pair of elongate flexible turf anchoring strips laterally outward of the outer bands of ribbons and secured to the backing by sewing or with adhesives. The installation method is varied to include cutting slits in the lateral sides of the trench to form two lateral turf bands. Each lateral turf band is then lifted to expose the bottom surface of the slits, and the anchoring strips are placed on the bottom surface of each slit. The lateral turf bands are then replaced upon the anchoring strips and secured in place with sod connectors such as long twisted screws or arrow head nails.

The anchoring strips are of an open weave fabric to allow the roots of the natural turf to grow into and entangle with the anchoring strips. The natural grass flap adjacent the green synthetic ribbons gradually grows into and blends with the outer edges of the outer synthetic green ribbon bands. The light coloured middle band of synthetic ribbons remains clear of natural grass to visually mark playing field lines in a permanent manner which requires significantly less maintenance than conventional line marking systems.

The second embodiment of the invention provides a synthetic grass turf strip for embedding between adjacent patio stones of a patio surface. In a like manner the strip has an elongate flexible sheet backing with an underside bedding surface. Parallel rows of synthetic ribbons extend upwardly from a top surface of the backing a pile height sufficient to extend a selected distance above said patio stones. A pair of elongate flexible anchoring strips extend laterally outward of the ribbons and are secured to the backing. Ballast on the backing secures the strip between adjacent patio stones and simulates soil between grass blades.

Further details of the invention and its advantages will be apparent from the detailed description and drawings included below.

BRIEF DESCRIPTION OF THE DRAWINGS

In order that the invention may be readily understood, preferred embodiments of the invention will be described by way of example, with reference to the accompanying drawings wherein.

DETAILED DESCRIPTION OF PREFERRED EMBODIMENTS

Figure 1:
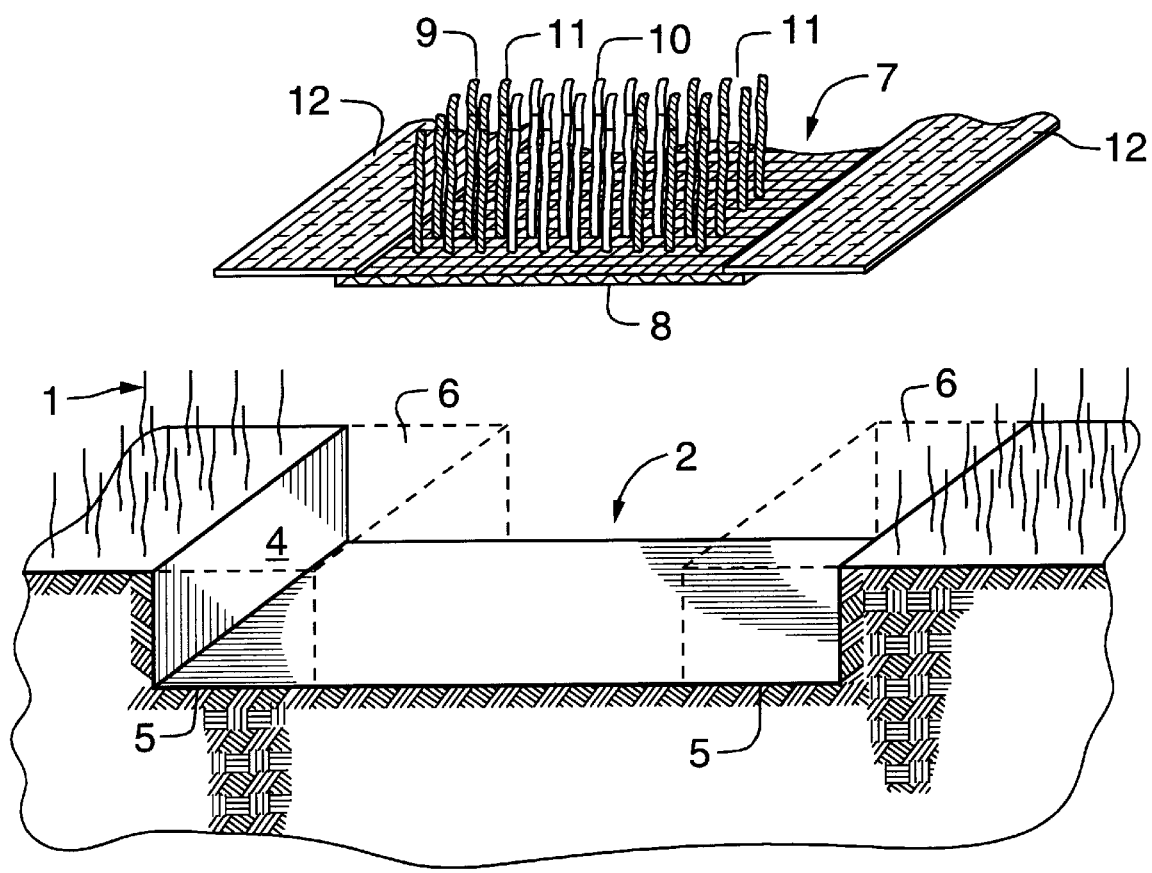
FIG. 1 is an exploded perspective view of a first embodiment of the invention with a trench having lateral turf bands on either side lifted up in order to allow insertion of the synthetic grass turf marking strip with laterally attached anchoring strips on either side.
Figure 2:
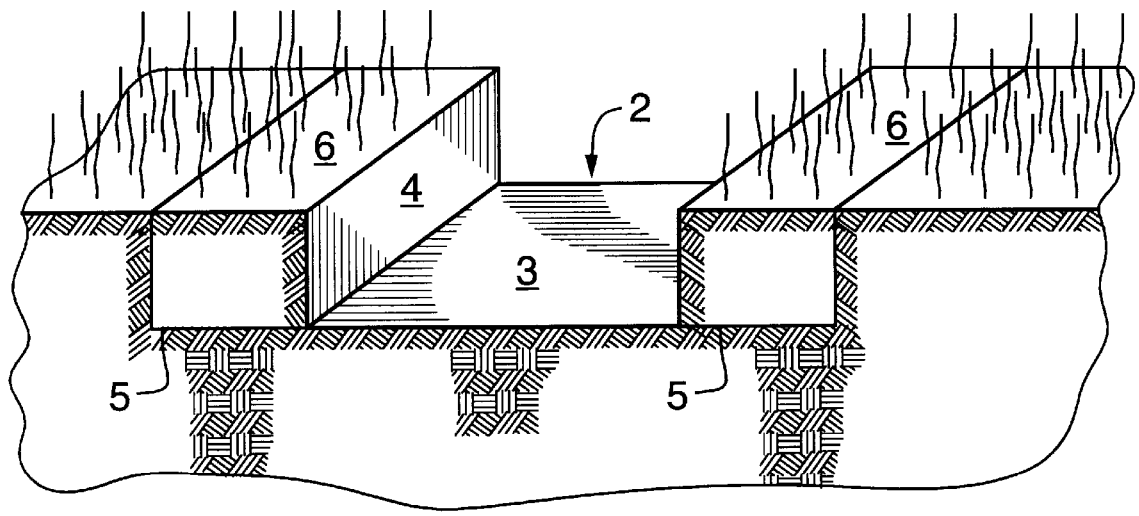
FIG. 2 is a drawing of the shallow trench cut into an existing natural grass turf surface with laterally extending slits cut into the soil adjacent the vertical edges of the trench to form the lateral turf bands.

With reference to FIG. 2, the first embodiment of the invention provides a method of visually marking a line in a natural grass turf surface (1), which is initiated by cutting a shallow trench (2), into the turf surface (1). The trench (2) has a bottom (3) and two vertical lateral sides (4). The synthetic grass turf marking strip may include laterally extending anchoring strips which provides improved anchorage within the natural grass turf surface (1). To accommodate the anchoring strips, the method preferably includes cutting slits (5) in the lateral sides (4) of the trench (2) to form two lateral turf bands seen in FIG. 1 and identified with numeral six (6). The trench (2) is cut using a sod cutter and lifting of each lateral turf band (6) above the slits (5) may be accomplished by manual lifting or with a plow like device to expose a bottom surface of the slits (5).

Figure 3:
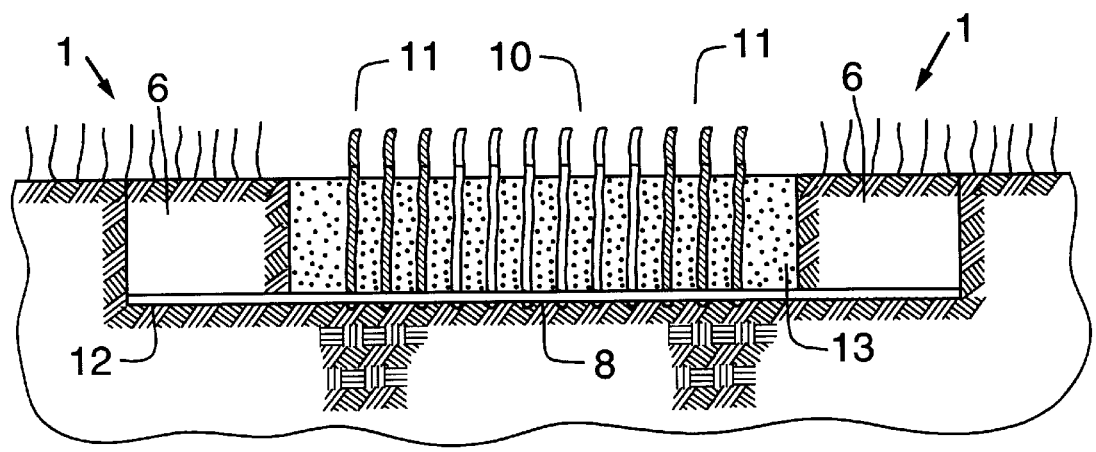
FIG. 3 is a sectional view through a completed line marking installation showing the lateral turf bands replaced over the anchoring strips and the synthetic grass turf marking strip positioned on the bottom of the trench with a middle band of ribbons of a light colour to mark the line and outer bands of a green colour to blend naturally with the laterally adjacent natural grass.

FIG. 3 shows a completed installation whereas FIG. 1 illustrates the intermediate installation of the synthetic grass turf marking strip (7). The strip (7) includes an elongate flexible sheet backing (8) the underside of which is laid into the trench on the trench bottom (3). The synthetic marking strip (7) includes several parallel rows of synthetic ribbons (9). The ribbons (9) extend upwardly from the top surface of the backing (8) to a pile height (indicated as dimension L in FIG. 4) sufficient to extend a selected distance indicated as dimension D in FIG. 4 (above the trench (2) in completed installation).

As indicated in FIG. (1) the rows of ribbons (9) include a middle band (10) of ribbons of a first line colour such as white or yellow to mark the line in the playing field. The rows of ribbon include a pair of outer bands (11) of a green colour or other colour to blend naturally with the colour of the natural grass turf (1).

Following the progression from FIG. (1) to FIG. (3), it can be seen that the underside of the backing (8) is easily placed on the trench bottom (3) and the laterally extending anchoring strips (12) laid on the bottom surface of each slit (5). The lateral turf bands (6) are replaced upon the anchoring strips (12) to partially secure the synthetic grass marking strip (7) into the trench (2).

As shown in FIG. 1, the elongate anchoring strips (12) are of a flexible open weave material preferably, which is secured to the backing (8) by sewing as shown or with adhesives.

Figure 4:
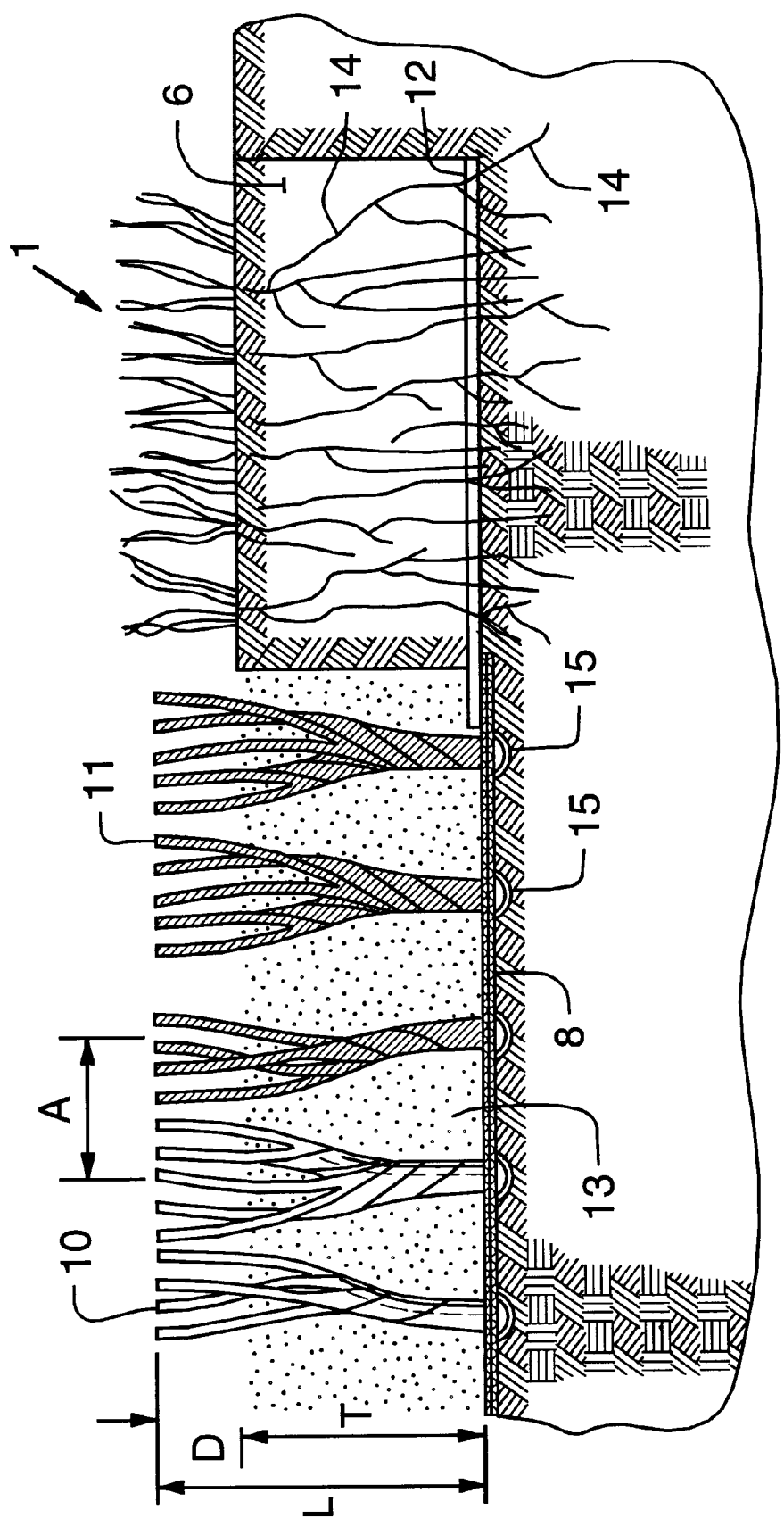
FIG. 4 is a detailed view similar to FIG. 3 specifically showing the granular material deposited between the parallel rows of synthetic ribbons to secure the marking strip within the trench and showing the natural grass with roots extending downwardly to interconnect with the open weave anchoring strip material.

As indicated in FIGS. 3 and 4, the next step of the installation procedure is depositing granular ballast material (13) on top of the backing (8) of the strip (7) and disposed between the parallel rows of synthetic ribbons (10) and (11) to a depth T. The ballast material (130 is preferably a mixture of silica sand and cryogenically ground crumb rubber which secures the marking strip (7) within the trench (2) under the weight of the ballast (13).

As indicated in FIGS. 3 and 4, the upper portion of the ribbons (10) and (11) extends beyond the ballast (13) a distance D. The light coloured ribbons (10) permanently mark the playing field line whereas the dark coloured ribbons (11) usually coloured green will merge and blend with the laterally adjacent natural grass surface (1).

Referring to FIG. 4, the anchor strips (12) can include any type of bonding means for interconnecting with roots (14) of the turf (1). For example, a fuzzy type fiber or multiple strands would entangle with the growing roots (14) to bind the anchoring strips (12) in the ground surface. Preferably the anchoring strips (12) include perforations to allow passage of the grass roots (14) through the anchoring strips (12) to improve the bond with the adjacent grass turf (1). A synthetic fiber open weave fabric is shown as the preferred anchoring strip (12) in the illustrations. Such fabrics are readily available and can be sewn to the backing (8) or secured with adhesives.

As show in FIG. 3 and best seen in FIG. 4, the granular ballast (13) provides means to secure the backing (8) within the trench (2) under the weight of the ballast (13). The ballast (13) is preferably of granular material to integrate into the surrounding soil and natural grass turf (1) and to fill the spaces between parallel rows of synthetic ribbons (10) and (11). Through experience it has been found that the preferred ballast (13) is a mixture of silica sand and ground crumb rubber. The preferred particle size range is between 4 and 70 mesh and depends on the matching of the adjacent natural turf and soil (1).

The trench (2) may be of a width between 2 and 24 inches depending on the width of the line and degree to which the natural turf (1) is required to blend in with the synthetic outer bands (11). If there is a noticeable difference between the characteristics of the natural turf (1) and the area filled with ballast (13), this difference may detrimentally effect the play of games on the surface or present a soft or hard ridge area with undesirable consequences. Where sand only is used in conjunction with synthetic grass sporting surfaces, the surfaces usually become hard after extended use because the sand between the rows of ribbons (10) and (11) becomes highly compacted. This tendency to become compacted can be offset by widening the space between parallel rows of adjacent ribbons (10) and (11). In general, resilient pads are used on the underside of synthetic grass sporting surfaces to provide some resilience; however, they usually slowly collapse under use becoming denser and less resilient. Removal, replacement or loosening of compacted particulate ballast (13) is difficult if the spacing between rows and ribbons (10) and (11) is close.

It has been found through experiment that the preferred spacing between adjacent rows of ribbons (10) and (11) is in the range between 5/16 and 2¼ inches. A closer spacing impedes the installation of the ballast (13) and may lead to compaction. It has also been found that the pile height of the parallel rows of ribbons, indicated in FIG. 4 as dimension L is preferably in the range of 1½ inches to five inches. A shorter pile height would tend to expose the backing (8) to wear and a longer pile height increases the cost and depth of ballast (13) and, in most applications, is unnecessary to improve the performance of the surface. In general, a shallow depth of cut is preferred since the disturbed soil and filled granular materials (13) settle after installation. A deeper cut depth leads to greater settlement.

Many prior art synthetic grass surfaces have been known to have relatively poor playing qualities and have fallen into disfavour with professional athletes due to the increased risk of injury and detrimental effects of game play. In applying such synthetic surfaces to the present invention, it can be seen that the designer must attempt to provide a relatively uniform playing characteristic between the transition from natural grass turf (1) to synthetic turf marking strip (7). Continuity between the characteristics of the adjacent playing surfaces is accomplished by careful choice of ballast (13) composition. Rounded sand particles had been thought to be preferable since they compact less and cause less abrasion; however, the surfaces can become very slippery. The use of longer ribbons (10) and (11) allows a thicker layer of ballast (13) to be used. Where the ballast includes resilient granules of ground rubber, the need for a resilient under padding is eliminated and the installation of the strip (7) is simpler and cheaper. A relatively thick layer of ballast (13) promotes better drainage. It has been found that the preferred depth of ballast (13) is within the range of ¼ to ¾ of the pile height of the adjacent ribbons (10) and (11). The longer ribbons provide a more realistic grass like surface in combination with the wide spacing between ribbon rows. This combination allows the players cleats to penetrate the surface for traction, but also allow easy release. Excessive penetration of cleats into the backing (8) would risk injury and damage to the turf marking strip (7). The ballast (13) is a mixture of silica sand which is readily available and ground rubber particles. Cryogenically ground rubber particles wet more easily than non-cryogenically ground rubber particles and therefore promote improved drainage. The designer must balance the ratio of sand to rubber depending on the desired resilience relative to the adjacent natural turf surface (1).

The ballast (13) is preferably a mixture of commonly available silica sand and cryogenically ground rubber particles. The designer chooses a ratio of hard sand particles to resilient rubber to match as closely as possible the characteristics of the adjacent natural turf surface (1). The harder the surface, the more sand is used in the ratio. Cyrogenically ground rubber is less angular than non-cryogenically ground rubber and therefore has less tendency to allow water and microscopic air bubbles carried by water to attach to it. Therefore, there is less tendency for the rubber particles to float upwardly when the surface is flooded. Separation of the particles results in loss of material and could change the playing qualities of the surface. Silica sand can be replaced if desired by graded gravel, hard and heavy granulated plastics with sizes between 4 and 70 mesh, preferably between 15 and 30 mesh for sports where abrasion of players contacting the surface is a factor and between 4 and 30 mesh where abrasion is not a factor. The cryogenically ground crumb rubber could be replaced by other resilient type materials, such as cork, styrene, EPDM rubber granules, neoprene or other similar materials. Use of perlite granules can enhance moisture absorption and reduce compaction as well. Use of sand will reduce the cost of the ballast (13). The ballast (13) is placed between the adjacent ribbons (10) and (11). Access to the strip (7) for maintenance or replacement can be had by inserting a compressed air wand into the ballast (13) to blow the ballast (13) out of the area. The backing (8) is a coarse fabric material through which the ribbons (10) and (11) are tufted. Porosity in the backing (8) promotes drainage through the backing which is essential for the proper maintenance of relatively flat playing surfaces. As indicated in FIG. 4 the backing (8) preferably comprises multiple plies of fabric layer. One of the plies may be a needle punched fabric layer to promote the moisture wicking properties of the backing (8) and enhance passage of water through the backing (8). Materials appropriate for backing use include woven or needle punched synthetic fabrics of nylon or polypropylene for example. Needle punching with synthetic fuzzy fibers enhances the wicking properties of the combined material.

The ribbons (10) and (11) consist of fibers such as polypropylene fibers, polyethylene fibers or other plastic fibers common to the synthetic grass surface manufacturing procedures. Ribbons are made from a strip having a width ranging between ¼ inch and 1 inch but preferably ½ inch wide. The thickness of the strips ranges between 65 microns and 150 microns. The ribbons (10) and (11) are cut from the strip and fastened by tufting to the backing (8) in parallel rows. Between two and eight tufts are formed per inch of row with four tufts per inch being preferred. The strips are mechanically fibrillated or split to a width of approximately ⅛ of an inch or more.

As indicated in FIG. 4, the underside connection of ribbons (10) (11) to backing (8) may be enhanced by applying an adhesive coating (15). Such a coating serves to better anchor the fibers of the ribbons (10) and (11) to the backing material. Spaces between the coating ridges (15) leave strip areas in the backing (8) to allow for drainage through the backing. Alternatively, the coating can be spread across the entire underside surface of the backing (8) to better prevent the growth of grass through the underside of the backing (8). Grass may have a tendency to grow over time underneath the backing and infiltrate between the spaces in the ballast (13) in the green fiber areas of ribbons (11). Application of a coating on the underside of the backing prevents such growth through the backing (8). The coating may be applied only in the underside area of the light coloured ribbons (10) if drainage is detrimentally affected by full underside coating. Alternatively, time release growth inhibitor compounds may be placed on the backing (8) either directly applied to the backing (8) or included in the granular ballast (13) to retard natural grass growth in the area of the strip.

Figure 5:
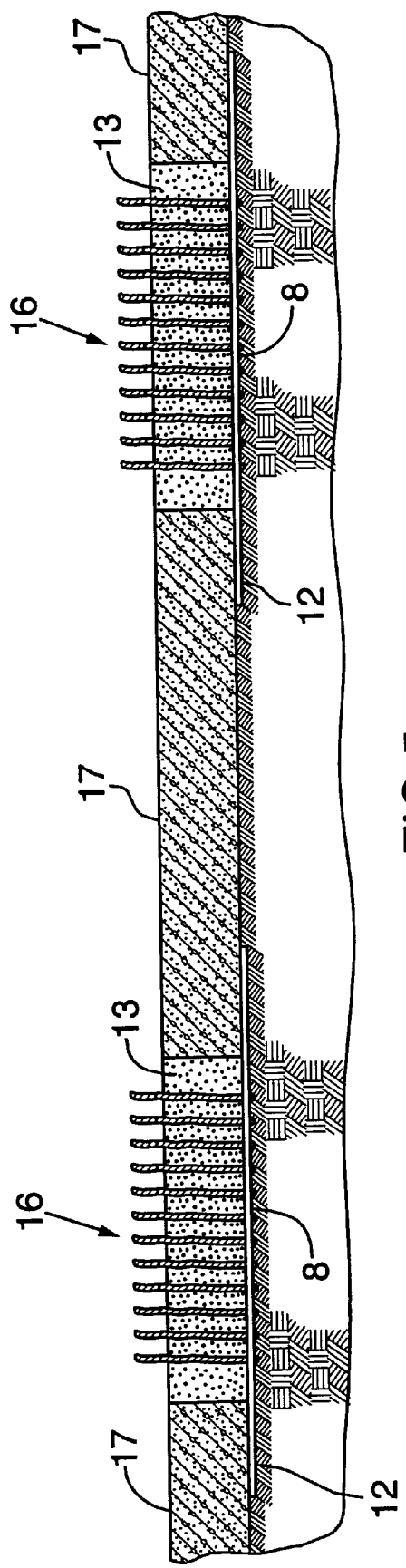
FIG. 5 is a sectional view through a completed patio stone installation, in accordance with the second embodiment of the invention, showing the anchoring strips secured under the patio stones, the synthetic grass turf strip positioned between adjacent patio stones, and granular ballast between the synthetic grass ribbons.

FIG. 5 illustrates a second embodiment of the invention where a one coloured green synthetic turf strip (16) is disposed between adjacent patio stones (17) resting on a level soil or sand subsurface. The strips (16) are placed on the subsurface and patio stones (17) placed over the anchoring strips (12). Ballast (13) is then deposited between the stones (17) and fills the space between individual ribbons of the turf strip (17).

Although the above description and accompanying drawings relate to specific preferred embodiments as presently contemplated by the inventor, it will be understood that the invention in its broad aspect includes mechanical and functional equivalents of the elements described and illustrated.

What is claimed is:

1. A synthetic grass turf marking strip, for visually marking lines in a natural grass turf surface when embedded within a shallow trench cut into the natural grass turf surface, said strip comprising:

an elongated flexible sheet backing, an underside of the backing comprising a trench bedding surface;

parallel rows of synthetic ribbons, extending upwardly from a top surface of the backing a pile height sufficient to extend a selected distance above said trench, the rows of ribbons including a middle band of ribbons of a line color and a pair of outer bands of ribbons of a green color laterally adjacent the middle band;

a pair of elongate flexible turf anchoring strips laterally outward of the outer bands of ribbons and secured to the backing; and ballast means on the backing for securing the marking strip within the trench, the ballast means comprising granular material disposed between the parallel rows of synthetic ribbons.

2. A turf marking strip according to claim 1 wherein the anchoring strips include bonding means for interconnecting with roots of the turf.

3. A turf marking strip according to claim 2 wherein the bonding means comprise a plurality of perforations in the anchoring strips.

4. A turf marking strip according to claim 3 wherein the anchoring strips comprise an open weave fabric.

5. A turf marking strip according to claim 1 wherein the granular material consists of particles selected from the group consisting of: sand; crumb rubber; gravel; granulated plastic; cork granules; styrene granules; EPDM rubber granules; neoprene granules; and perlite granules.

6. A turf marking strip according to claim 5 wherein the granular material comprises a mixture of silica sand and ground crumb rubber.

7. A turf marking strip according to claim 5 wherein the particles range in size between four and seventy mesh.

8. A turf marking strip according to claim 1 wherein the backing comprises a fabric through which the ribbons are tufted.

9. A turf marking strip according to claim 8 wherein the backing comprises multiple plies of fabric layers.

10. A turf marking strip according to claim 9 including a needle punched fabric layer.

11. A turf marking strip according to claim 8 wherein the backing includes coating means on the backing underside for securing the ribbons to the backing.

12. A turf marking strip according to claim 8 wherein the backing includes coating means on the backing underside for impeding growth of natural turf grass through the backing.

13. A turf marking strip according to claim 1 wherein the ribbons consist of fibers selected from the group consisting of: polypropylene fibers; polyethylene fibers; and plastic fibers.

14. A turf marking strip according to claim 1 wherein the parallel rows of ribbons are spaced apart a distance in the range between 5/16 to 2¼ inches, and the parallel rows of ribbons have a pile in the range between 1½ to 5 inches.

15. A turf marking strip according to claim 1 further including time release growth inhibitors on the backing.

* * * * *